United States Patent

Tanaka et al.

Patent Number: 6,023,475
Date of Patent: Feb. 8, 2000

[54] DATA PACKET TRANSMISSION METHOD AND APPARATUS FOR PRACTICING THE SAME

[75] Inventors: Masahiko Tanaka; Kenji Okita, both of Tokyo, Japan

[73] Assignee: NEC Corporation, Tokyo, Japan

[21] Appl. No.: 08/827,170

[22] Filed: Mar. 27, 1997

[30] Foreign Application Priority Data

Mar. 27, 1996 [JP] Japan .................................. 8-071673

[51] Int. Cl.[7] .................................................. H04J 3/24
[52] U.S. Cl. ........................................ 370/471; 370/252
[58] Field of Search .................................... 370/229, 230, 370/231, 235, 252, 465, 470, 471, 472, 474, 476; 364/131; 395/200.62, 200.63, 200.65, 200.66; 455/557, 69

[56] References Cited

U.S. PATENT DOCUMENTS

| | | | |
|---|---|---|---|
| 4,697,281 | 9/1987 | O'Sullivan | 455/557 |
| 5,027,348 | 6/1991 | Curry, Jr. | 370/470 |
| 5,414,697 | 5/1995 | Osaki | 370/252 |
| 5,602,831 | 2/1997 | Gaskill | 370/470 |
| 5,706,281 | 1/1998 | Hashimoto et al. | 370/470 |
| 5,706,439 | 1/1998 | Parker | 370/237 |
| 5,719,786 | 2/1998 | Nelson et al. | 370/237 |

FOREIGN PATENT DOCUMENTS

| | | |
|---|---|---|
| 0 454 364 A2 | 10/1991 | European Pat. Off. . |
| 3-131143 | 6/1991 | Japan . |
| 5-153132 | 6/1993 | Japan . |
| WO 94/18771 | 8/1994 | WIPO . |
| WO 96/02096 | 1/1996 | WIPO . |

*Primary Examiner*—Ricky Ngo
*Attorney, Agent, or Firm*—Scully, Scott, Murphy & Presser

[57] ABSTRACT

In a data packet transmission method and an apparatus for realizing the method, data packet transmission/reception is performed between communication apparatuses each having a CPU for controlling an entire operation of the apparatus. An operating efficiency of the CPU of the communication apparatus on a reception side is detected when a data packet transmission/reception request is generated. An optimum data packet length for reception of a data packet is determined in correspondence with the detected operating efficiency, and the communication apparatus on a transmission side is informed of the optimum data packet length. The data packet to be transmitted is assembled to have the optimum data packet length, and the data packet is transmitted.

3 Claims, 3 Drawing Sheets

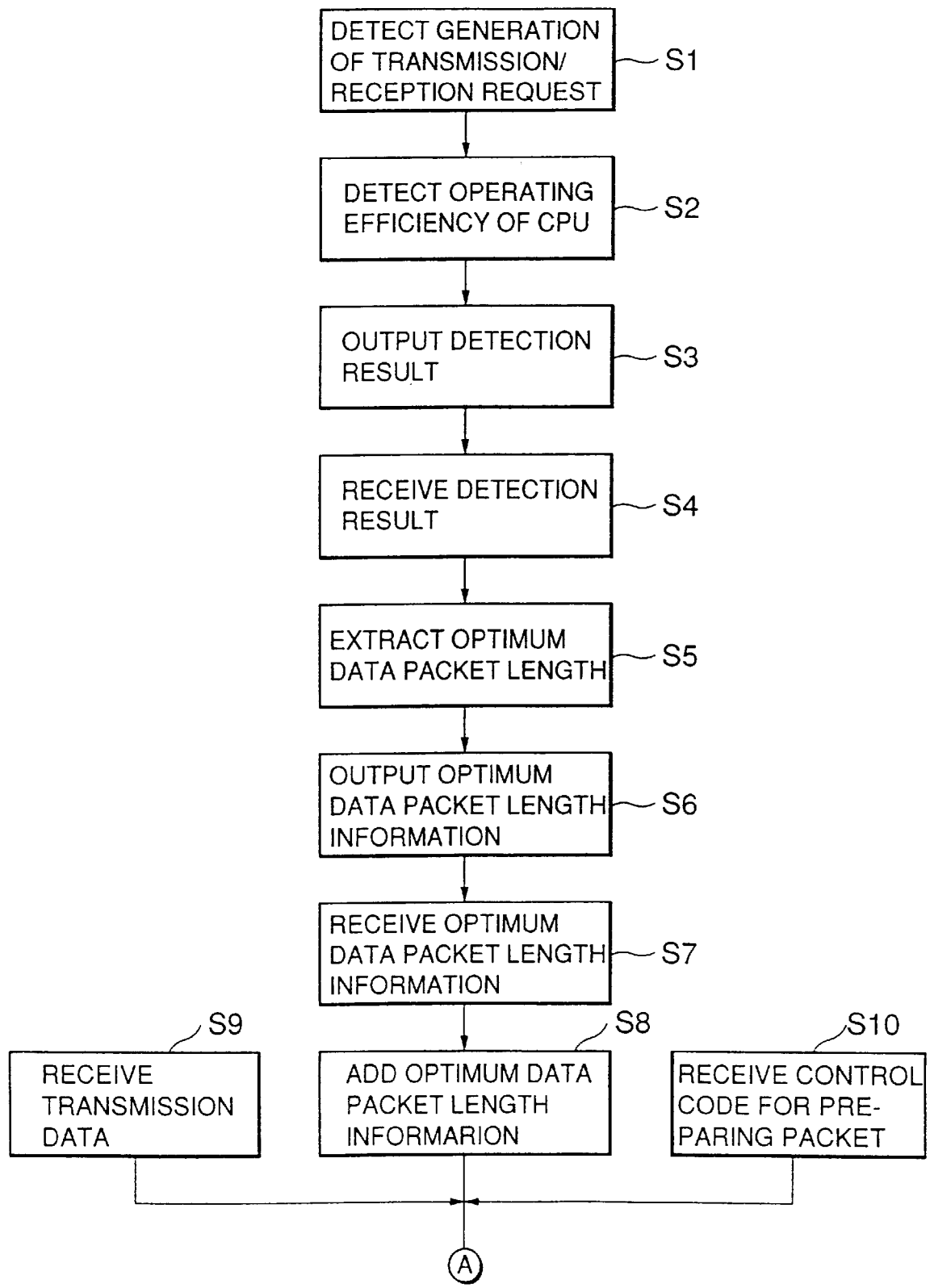

DATA PACKET TRANSMISSION METHOD AND APPARATUS FOR PRACTICING THE SAME

BACKGROUND OF THE INVENTION

1. Field of the Invention

The present invention relates to a packet data transmission method of transmitting data using a packet and an apparatus for practicing the same.

2. Description of the Prior Art

Conventionally, a data packet transmission apparatus using an error correction protocol is used to enable economical and efficient data packet transmission. A technique is described in, e.g., Japanese Unexamined Patent Publication No. 3-131143 in which a retransmission counter for monitoring the packet retransmission ratio is arranged on the transmission side, and if a packet is discarded during transmission/reception of a data packet which is divided into portions each having a maximum data packet length or if a transmission error is generated in each data packet information, the maximum data packet length to be set is changed for retransmission on the basis of the packet retransmission ratio calculated by the retransmission ratio counter.

In this conventional data packet transmission, the reception side receives data from the transmission side, and the transmission side receives retransmission command data from the reception side. The retransmission ratio is calculated in accordance with the retransmission command data, and the optimum data packet length is calculated on the basis of the retransmission ratio. Since the time for data packet length calculation and the time for data transmission are required, the data packet length is determined with a delay, resulting in a degradation in transmission efficiency.

SUMMARY OF THE INVENTION

The present invention has been made in consideration of the above situation of the prior art, and has as its object to provide a data packet transmission method which allows highly efficient data transmission by minimizing a delay in determining the optimum data packet length, and an apparatus for realizing the method.

In order to achieve the above object, according to the first aspect of the present invention, there is provided a data packet transmission method of performing data packet transmission/reception between communication apparatuses each having a CPU for controlling an entire operation of the apparatus, comprising the steps of detecting an operating efficiency of the CPU of the communication apparatus on a reception side when a data packet transmission/reception request is generated, determining an optimum data packet length for reception of a data packet in correspondence with the detected operating efficiency and informing the communication apparatus on a transmission side of the optimum data packet length, and assembling the data packet to be transmitted to have the optimum data packet length and transmitting the data packet.

In order to achieve the above object, according to the second aspect of the present invention, there is provided a data packet transmission apparatus which has a CPU for controlling an entire operation of the apparatus and performs data packet transmission/reception, comprising detection means for detecting an operating efficiency of the CPU, first control means, having a table in which an optimum data packet length corresponding to the operating efficiency is stored in advance, for determining the optimum data packet length referring to the table on the basis of the operating efficiency detected by the detection means, and second control means for setting information of the optimum data packet length determined by the first control means in a data packet to be transmitted and transmitting the data packet to a transmission side, wherein the operating efficiency of the CPU is determined on the basis of a current consumption of the CPU.

According to the above aspects of the present invention, in data transmission of performing data packet transmission/reception between communication apparatuses each having a CPU for controlling an entire operation of the apparatus, an operating efficiency of the CPU of the communication apparatus on a reception side is detected when a data packet transmission/reception request is generated, an optimum data packet length for reception of a data packet is determined in correspondence with the detected operating efficiency and the communication apparatus on a transmission side is informed of the optimum data packet length, and the data packet to be transmitted is assembled to have the optimum data packet length and the data packet is transmitted. With this method, highly efficient data transmission is enabled by minimizing a delay in determining the optimum data packet length and also minimizing the influence of noise generated by the CPU.

The above and other advantages, features and additional objects of the present invention will become manifest to those versed in the art upon making reference to the following detailed description and accompanying drawings in which preferred embodiments incorporating the principle of the present invention are shown by way of illustrative example.

BRIEF DESCRIPTION OF THE DRAWINGS

FIGS. 3-1 and 3-2 are flow charts showing processing steps of a data packet transmission method according to the present invention.

DETAILED DESCRIPTION OF THE PREFERRED EMBODIMENT

A preferred embodiment of the present invention will be described below with reference to the accompanying drawings.

Figure 1:
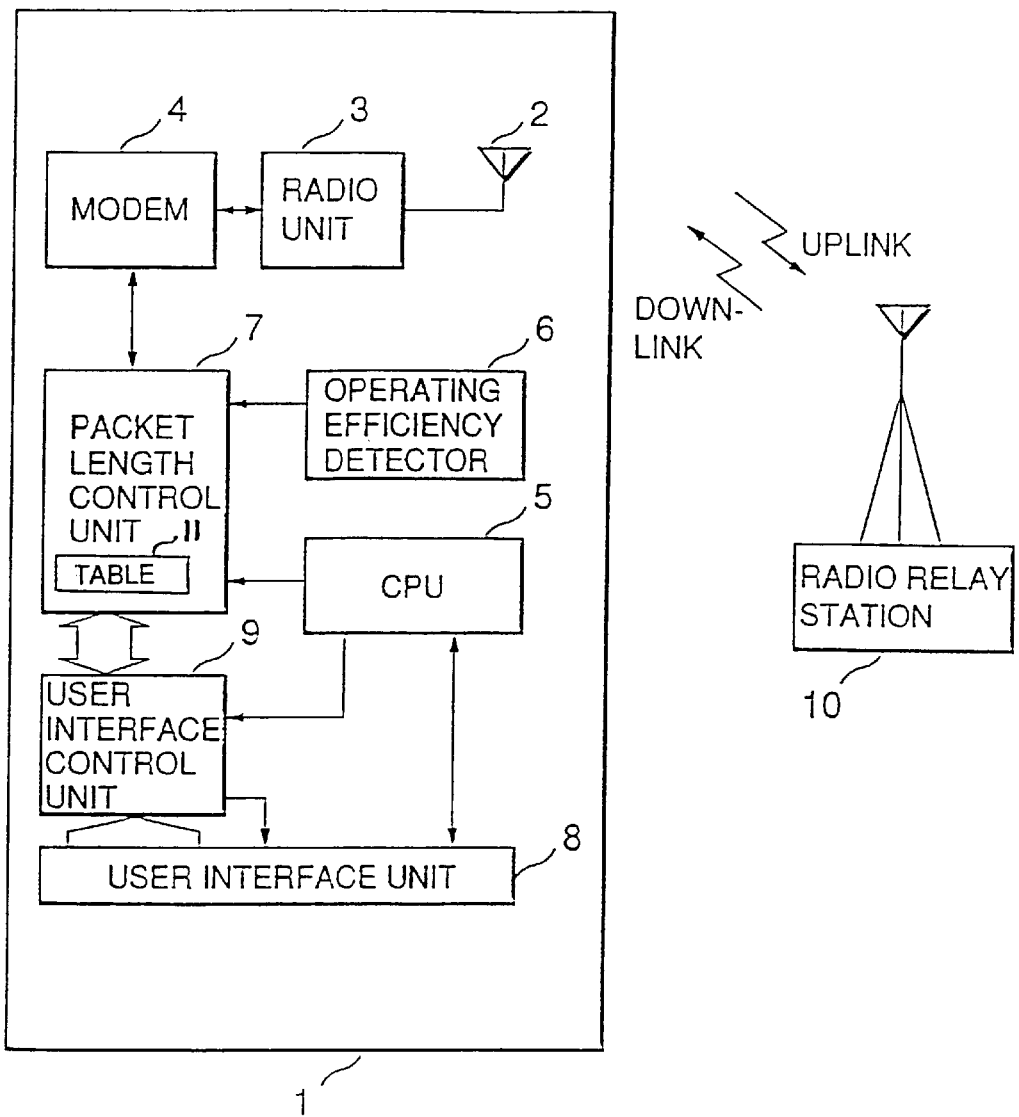
FIG. 1 is a block diagram showing the overall arrangement of a data packet transmission apparatus according to an embodiment of the present invention.

FIG. 1 shows a radio communication terminal station (to be referred to as a terminal station hereinafter) 1 for transmitting/receiving a data packet, and a radio relay station (to be referred to as a relay station hereinafter) 10 for relaying data transmission to the terminal station 1 in the radio interval. The terminal station 1 comprises an antenna 2, a radio unit 3 as an interface to a partner radio device in radio data transmission, a modem 4 for modulating/demodulating data, a central processing unit (to be referred to as a CPU hereinafter) 5 for controlling the entire operation of the device of the terminal station, an operating efficiency detector 6 for detecting the operating situation of the CPU 5, a packet length control unit 7 having a table 11 in which an optimum data packet length corresponding to the CPU operating situation, and serving as the first means for determining the optimum data packet length by referring to the table on the basis of the operating efficiency detected by the operating efficiency detector 6, a user interface unit 8 constituted by an LCD for inputting data, a keyboard, a microphone, an LCD for outputting data, a loudspeaker, and the like, and a user interface control unit 9 serving as the second control means for transmitting, to the transmission side, a data packet to be transmitted, the data packet being received from the user interface unit 8 and including the optimum data packet length information determined by the packet length control unit 7.

Noise generated by the CPU changes depending on the characteristics, use environment, and wiring of the CPU. In general, when the operating efficiency is high, i.e., when the current consumption is large, much noise is generated. To the contrary, when the operating efficiency is low, i.e., when the current consumption is small, noise is minimized. Therefore, indication of noise generation can be obtained by detecting the operating efficiency. Efficient data transmission can be performed on the basis of this operating efficiency.

The operating efficiency detector 6 determines the operating efficiency of the CPU 5 on the basis of its current consumption. For example, the threshold value of the current consumption of the CPU 5 is divided into values of three levels. Optimum data packet lengths corresponding to these threshold values are stored in advance in a database (not shown) in the packet length control unit 7. The packet length control unit 7 compares the detected current consumption value with the threshold values, thereby selecting and determining an optimum data packet length.

Information associated with the above-described optimum data packet length is obtained from the operating efficiency of the CPU 5 in the terminal station 1 which performs a reception operation, and is transmitted to the transmission side as optimum transmission data packet information in a data packet to be transmitted.

Figure 2:
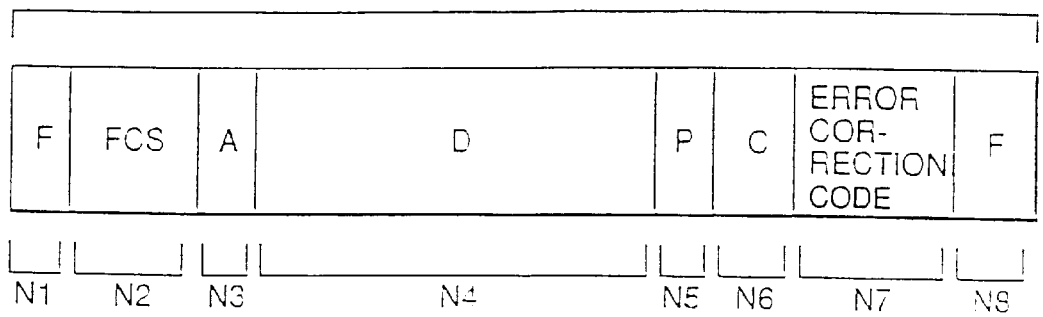
FIG. 2 is a view showing an example of the signal frame structure of a data packet in the embodiment shown in FIG. 1.

FIG. 2 is a view showing an example of the frame structure of a data packet in the embodiment of the present invention. A data packet N consists of a flag sequence F indicating the packet start position, a frame check sequence FCS for detecting a transmission error, an address field A indicating the address of the transmission destination, transfer data D whose data length is optimized in accordance with the operating efficiency of the CPU 5 of the partner station, a control field C for control bits, an error correction code for error correction, an optimum transmission data packet length information field P, and a flag sequence F indicating the packet end position.

The packet length of a data packet is recognized by the optimum transmission data packet length information field P obtained from the operating efficiency of the CPU 5 in the terminal station 1 which performs the reception operation. For example, the number of bits of the respective information in the packet N may be set: N1=20 bits, N2=16 bits, N3=20 bits, N4=variable (optimum length), N5=3 bits, N6=6 bits, N7=8 bits, and N8=20 bits.

Figures 2, 3:
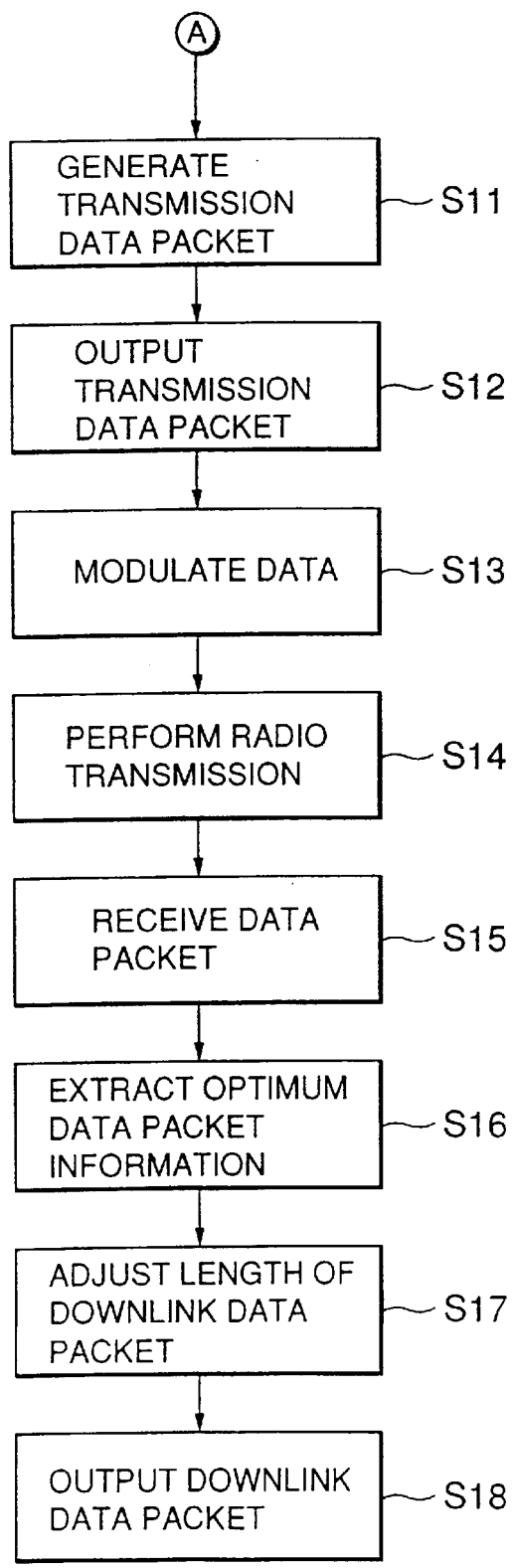

An example of the procedure of a data packet transmission method according to the present invention will be described below with reference to FIGS. 3-1 and 3-2.

In the terminal station 1, when the CPU 5 detects a data packet transmission/reception request (step 1: S1), the operating efficiency detector 6 detects the operating efficiency of the CPU 5 in accordance with the request (S2) and outputs the detection result (S3). The packet length control unit 7 receives the detection result output in S3 (S4), extracts an optimum data packet length corresponding to the detection result (e.g., the current consumption value of the CPU) from the database (table) (not shown) in the packet length control unit (S5), and outputs optimum data packet length information based on the extraction result (S6).

The user interface control unit 9 receives the output information (S7) and assembles this optimum data packet length information, transmission data received from the user interface unit 8, and a control code necessary in the transmission packet together (S8 to S10), thereby generating a transmission data packet (S11). The user interface control unit 9 outputs the generated data packet to the modem 4 (S12). The modem 4 modulates the data packet (S13). The radio unit 3 performs transmission processing (S14) to transmit the data packet to the relay station 10 via the antenna 2.

The relay station 10 receives the data packet transmitted from the terminal station 1 (S15), extracts the optimum data packet length information from the data packet (S16), adjusts the downlink data packet to the terminal station 1 to the designated optimum length on the basis of the information (S17), and outputs the downlink data packet (S18).

As described above, in the present invention, when a data packet is to be transmitted, noise radiated from the CPU and the state of the transmission line in the terminal station are predicted on the basis of the operating efficiency, i.e., the current consumption of the CPU on the reception side for receiving data, and a data length suitable for this state is selected. More specifically, when much noise is generated from the CPU, or when the transmission line is not in a preferable state, the error ratio of the data to be transmitted becomes high. Since a long time is required for data retransmission, the data is divided into a lot of units and transmitted. On the other hand, when minimum noise is generated from the CPU, or when the transmission line is in a suitable state, data with a large length is transmitted at once. This is because when the data is divided into a number of portions and transmitted, the amount of control data increases relative to the data to be transmitted, resulting in a decrease in throughput.

In this embodiment, data packet transmission/reception between the terminal station and the relay station has been described. However, the present invention can also be applied even to a communication form for performing data packet transmission/reception between terminals A and B each having a packet generation function when the terminal A is set on the reception side (on the terminal station side) and the terminal B is set on the transmission side (on the relay station side) to obtain the same relationship as that between the terminal station 1 and the relay station 10.

What is claimed is:

1. A data packet transmission method of performing data packet transmission/reception between communication apparatuses each having a CPU for controlling an entire operation of each of said apparatuses respectively, comprising the steps of:

detecting an operating efficiency of said CPU of said communication apparatus on a reception side when a data packet transmission/reception request is generated;

determining an optimum data packet length for reception of a data packet in correspondence with the detected operating efficiency and informing said communication apparatus on a transmission side of the optimum data packet length; and assembling the data packet to be transmitted to have the optimum data packet length and transmitting the data packet.

2. A data packet transmission apparatus which has a CPU for controlling an entire operation of said apparatus and performs data packet transmission/reception, comprising:

detection means for detecting an operating efficiency of said CPU;

first control means, having a table in which an optimum data packet length corresponding to the operating efficiency is stored in advance, for determining the optimum data packet length by referring to said table on the basis of the operating efficiency detected by said detection means; and second control means for setting information of the optimum data packet length determined by said first control means in a data packet to be transmitted and transmitting the data packet to a transmission side.

3. An apparatus according to claim 2, wherein the operating efficiency of said CPU detected by said detection means is determined on the basis of current consumption of said CPU.

* * * * *